United States Patent [19]
Cochran

[11] Patent Number: 6,082,676
[45] Date of Patent: Jul. 4, 2000

[54] CRYOGENIC TANKS FOR LAUNCH VEHICLES

[75] Inventor: David B. Cochran, Bellevue, Wash.

[73] Assignee: Kistler Aerospace Corporation, Kirkland, Wash.

[21] Appl. No.: 09/030,662

[22] Filed: Feb. 25, 1998

[51] Int. Cl.[7] .................................................. B64G 1/00
[52] U.S. Cl. ...................................................... 244/158 R
[58] Field of Search ........................... 244/135 R, 158 R, 244/169; 114/74 A; 220/445

[56] References Cited

U.S. PATENT DOCUMENTS

| | | |
|---|---|---|
| 2,613,715 | 10/1952 | Johnson et al. . |
| 2,842,337 | 7/1958 | Bennett . |
| 3,304,724 | 2/1967 | Blumrich et al. .................... 244/158 R |
| 4,111,146 | 9/1978 | Babcock et al. . |
| 4,113,130 | 9/1978 | Lazenby et al. . |
| 4,430,954 | 2/1984 | Schuler . |
| 4,451,017 | 5/1984 | Marshall .................................. 244/172 |
| 4,496,073 | 1/1985 | Silver et al. ............................ 220/445 |
| 4,509,657 | 4/1985 | Grondalen . |
| 4,556,591 | 12/1985 | Bannink, Jr. . |
| 4,672,906 | 6/1987 | Asai . |
| 4,715,565 | 12/1987 | Wittmann ............................. 244/158 R |
| 5,143,327 | 9/1992 | Martin ................................... 244/158 R |
| 5,143,328 | 9/1992 | Leonard ................................ 244/158 R |
| 5,201,832 | 4/1993 | Porter et al. ......................... 244/158 R |
| 5,257,761 | 11/1993 | Ratz et al. . |

OTHER PUBLICATIONS

D. E. Koelle, et al., "The Single–Stage Resuable Ballistic Launcher Concept for Economic Cargo Transportation," 37th Congress of The International Astronautical Federation, Oct., 1986, 7 pages.

A. P. Bruckner, et al., "IAF 92–0859 Antares: A Low Cost Modular Launch Vehicle Concept," 43rd Congress of the International Astronautical Federation, Aug.–Sep., 1992, 14 pages.

Steven J. Isakowitz, "International Reference Guide to Space Launch Systems," American Institute of Aeronautics and Astronautics, 1991, 295 pages.

*Primary Examiner*—Peter M. Poon
*Assistant Examiner*—Charles R. Ducker, Jr.
*Attorney, Agent, or Firm*—Baker Botts LLP

[57] ABSTRACT

An aluminum cryogenic tank for launch vehicles has aluminum skirts that extend from each end of a peripheral wall of a tank body. The skirts provide a temperature differential between the tank body and the ends of the skirts so that composite panels can be used in locations longitudinally proximate to the tank body without over stressing either the skirts or the composite panels in regions near their junctures and without sacrificing structural integrity of the composite panels due to an excessively low temperature. The peripheral wall of the tank and the skirts provide a portion of a structural/aerodynamic wall or shell of the launch vehicle.

28 Claims, 2 Drawing Sheets

CRYOGENIC TANKS FOR LAUNCH VEHICLES

TECHNICAL FIELD OF THE INVENTION

The present invention relates to launch vehicles and, in particular, to launch vehicles that are powered by liquid-fueled rocket engines and thus have cryogenic tanks.

BACKGROUND OF THE INVENTION

The cryogenic tanks of launch vehicles powered by rocket engines fueled by liquid propellants are subject to extremely large variations in temperature. When the vehicle is stored for a future launching and the cryogenic tanks are empty, the tanks are at ambient temperatures, which might run as high as 100° F. or more. When the vehicle is prepared for launching, the cryogenic tanks are full and near the temperature of their contents, such as liquid oxygen at approximately −310° F. The magnitudes of thermal expansion and contraction of the cryogenic tanks are considerable. Components of the vehicle that are attached to the tanks are also subject to being cooled from ambient to a very low temperature by loss of heat to the tank by conduction.

Composite materials are being used increasingly in aircraft of all forms, including launch vehicles. The use of composite materials in proximity to cryogenic tanks, and indeed in any location in a launch vehicle that has one or more cryogenic tanks, presents problems that result from the large difference between the coefficient of thermal expansion of the material of the cryogenic tank, such as aluminum, and the coefficients of thermal expansion of composite materials.

SUMMARY OF THE INVENTION

An object of the present invention is to provide an outer structural/aerodynamic wall for a launch vehicle in which the peripheral wall portion of a metal cryogenic tank can be incorporated in relatively close proximity to portions made of a composite material. Another object of the present invention is to provide a launch vehicle that is powered by one or more liquid-fueled rocket engines in which a peripheral wall of a main cryogenic tank forms part of the structural/aerodynamic outer wall of the vehicle and sections of composite material are used for a major part of the remaining portion of the outer structural/aerodynamic wall.

The foregoing objects are attained, in accordance with the present invention, by an outer structural/aerodynamic wall for a launch vehicle comprising a peripheral wall portion of a metal cryogenic tank, the peripheral wall portion having a forward end and an aft end. A metal forward skirt is attached to the forward end of the peripheral wall portion of the cryogenic tank and has a forward end spaced apart from the forward end of the peripheral wall portion of the cryogenic tank. A forward wall member of composite material is attached to the forward end of the forward skirt.

The forward skirt, by virtue of its thermal conductivity, receives heat from the ambient air and from the wall member of composite material to which its forward end is attached and conducts the heat from its forward end to its aft end, where it is attached to the peripheral wall of the cryogenic tank. The forward skirt and (where included, as described below) an aft skirt provides a temperature differential between the tank and the wall member of composite material. The heat flow maintains a temperature gradient between the forward end and the aft end of the skirt when the cryogenic tank is filled. This temperature gradient maintains the forward end of the skirt at a temperature high enough to prevent exertion of undesirable stresses on the aft end of the forward wall member by the skirt due to circumferential thermal contraction of the skirt. The temperature gradient also prevents the temperature of the aft end portion of the forward wall member from being lowered to a level that would make it frangible. The length of the forward skirt should be such as to maintain the forward end of the skirt above a desired temperature (e.g., −60° F.) to ensure the structural integrity of the forward wall member. In a particular embodiment, a length of not less than about thirty inches is suitable.

An outer structural/aerodynamic wall for a launch vehicle may also include a metal aft skirt attached to the aft end of the peripheral wall portion of the cryogenic tank and having an aft end spaced apart from the aft end of the peripheral wall portion of the cryogenic tank and an aft wall member of composite material attached to the aft end of the aft skirt. The aft skirt functions in the same way as the forward skirt in providing a path for heat flow between the aft composite wall member and the peripheral wall of the tank.

The forward skirt may comprise a skirt ring attached to the forward end of the peripheral wall portion of the cryogenic tank and a skirt barrel panel attached to a forward end of the skirt ring. The forward end of the peripheral wall portion of the cryogenic tank may have an outwardly extending flange portion, and the skirt ring may have an outwardly extending flange portion that mates with the flange portion of the forward end of the peripheral wall portion of the cryogenic tank. The skirt ring in such an arrangement is attached to the peripheral wall portion of the cryogenic tank by bolts that pass through the mating flange portions and receive nuts. The skirt barrel panel has a plurality of internal circumferentially spaced-apart, axially extending stiffening ribs. The aft skirt, where provided, can be of the same construction as the forward skirt.

According to another aspect of the present invention, a cryogenic tank for a launch vehicle has a circular cylindrical peripheral wall portion adapted to form a portion of an outer structural/aerodynamic wall of the launch vehicle and having a forward end and an aft end. A metal forward skirt is attached to the forward end of the peripheral wall portion and has a forward end spaced apart from the forward end of the peripheral wall portion of the cryogenic tank. A metal aft skirt is attached to the aft end of the peripheral wall portion and has an aft end spaced apart from the aft end of the peripheral wall portion of the cryogenic tank. The lengths of the forward skirt and aft skirt are chosen to ensure the structural integrity of forward and aft wall members, respectively, formed of composite materials. The forward skirt and aft skirt are adapted to form portions of the outer structural/aerodynamic wall of a launch vehicle.

Both the forward skirt and the aft skirt have a skirt ring attached to the peripheral wall portion of the cryogenic tank and a skirt barrel panel attached to the skirt ring. The peripheral wall portion of the cryogenic tank has an outwardly extending flange portion at each end, and each skirt ring has an outwardly extending flange portion that mates with the flange portion of the corresponding end of the peripheral wall portion. The skirt rings are attached to the peripheral wall portion by bolts that pass through the mating flange portions and receive nuts. The skirt barrel panel has a plurality of internal circumferentially spaced-apart axially extending stiffening ribs.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
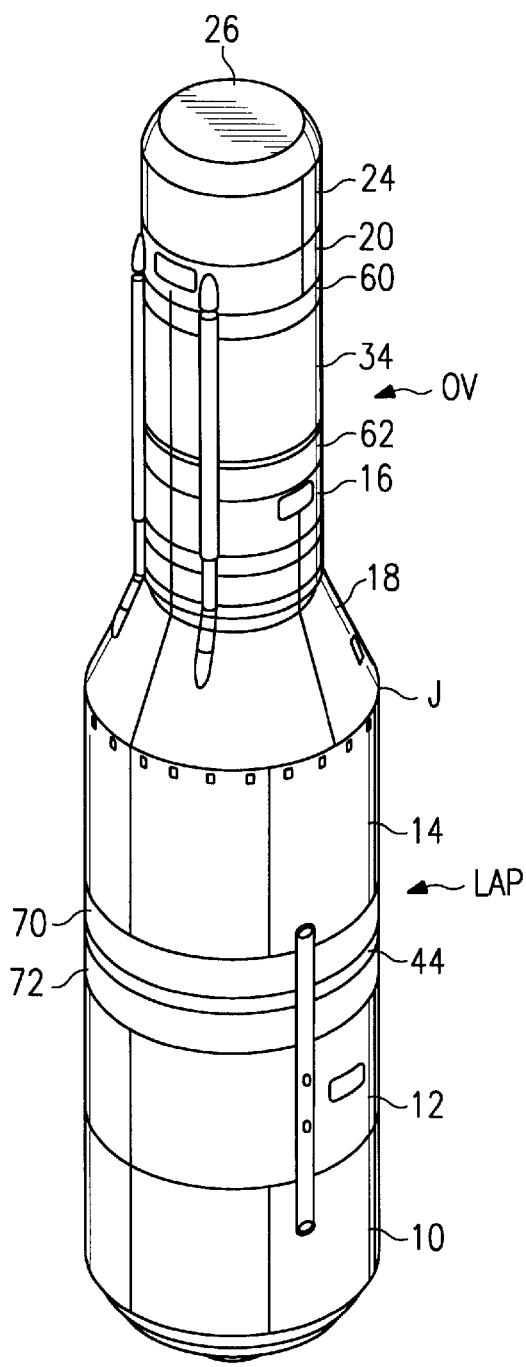
FIG. 1 is a front pictorial view of a launch vehicle, taken from a vantage point slightly above the forward end of the vehicle.

FIG. 1 shows a two-stage launch vehicle that includes an orbital vehicle (OV) and a launch assist platform (LAP), the latter being used to propel the former part of the way to an orbit around the earth. The juncture of the LAP with the OV is indicated by the line J. The two-stage combination LAP/OV is designed to take payloads, such as communications satellites, supplies for manned orbital stations, and the like, into earth orbit. Both the LAP and the OV have rocket engines that are fueled by a liquid propellant. Thus, both vehicles also have a cryogenic tank for supplying liquid oxygen, liquid hydrogen, or other suitable cryogenic liquid or material to the engine.

Both portions of the launch vehicle may be recovered near the launch site and reused to considerably reduce the cost of placing payloads in orbit. For present purposes, the description of the details of the design of the launch vehicle focuses on the structural/aerodynamic walls or shells. The present invention is applicable to any type of launch vehicle that has one or more rocket engines fueled by a liquid propellant and supplied with a cryogenic liquid from a cryogenic tank.

Composite materials (matrices of various fibers dispersed in and bonded by a resin binder) are well-known and are being widely used in aircraft and launch vehicles. They are typically strong, light in weight for a given strength and, as compared to many other materials, notably metals, relatively easy to work with. Both the LAE and the OV have wall members in several bays that are made of a composite material. All of the wall members that are made of a composite material (hereinafter usually referred to as "composite panels") have web portions, which form the outer skin surface of the vehicle, and internal ribs, both annular and axial, which impart additional strength and rigidity to the panels. Each composite panel is a circular cylindrical tube, which can be fabricated in one piece or in segments that are joined by adhesive, splices of composite materials, and/or mechanical connectors. The design of the composite panels to carry the loads and support the LP (liquid propellant) tanks and the cryogenic tanks, which are the predominant loads of both vehicles, and the ancillary thruster systems, engine and steering control systems, and communication packages, is within the ordinary skill of the art. Therefore, specific designs for the composite panels are neither illustrated nor described.

The composite panels of the launch vehicle (LAP/OV) include two aft panels 10 and 12 adjacent the aft end of the LAP, a forward panel 14 adjacent the forward end of the LAP, an aft panel 16 adjacent an aft conical panel 18 of the OV, and a forward panel 20 of the OV. The conical panel 18 of the OV is subject to very high temperatures due to aerodynamic heating upon reentry and has a metal base and a covering of a ceramic or other heat-resistant material. The forward end panel 24 and a nose 26 of the OV enclose a payload bay of the OV. The nose is arranged to open for release of the payload and then close after the payload is released. The end panel 24 and nose 26 are constructed to withstand aerodynamic heating and loads experienced during ascent and reentry.

Figure 2:
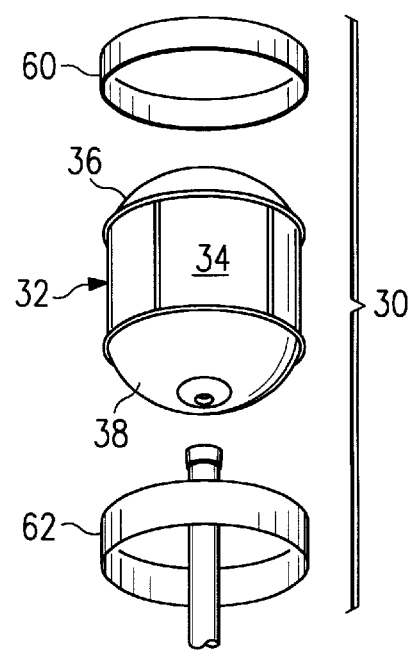
FIG. 2 is an exploded, generally schematic pictorial view of the cryogenic tank of the orbital vehicle of the launch vehicle of FIG. 1.

FIG. 2 illustrates cryogenic tank 30, which has a tank body 32 having a circular cylindrical peripheral wall 34, a forward dome 36 and an aft dome 38. The peripheral wall 34 is formed in circumferentially adjacent segments from aluminum plates, each of the segments being rolled to the required curvature and CNC-machined to form a relatively thin web or membrane with closely spaced-apart (e.g., 2° circumferentially apart) and axially extending ribs on the outer surface of the web. In a particular embodiment, the domes are formed by spinning annular segments and a center spherical segment from aluminum plate stock and welding the segments together. The segments of the peripheral wall 34 are joined by welding. Other aspects of the construction of the OV cryogenic tank are described below.

Figure 3:
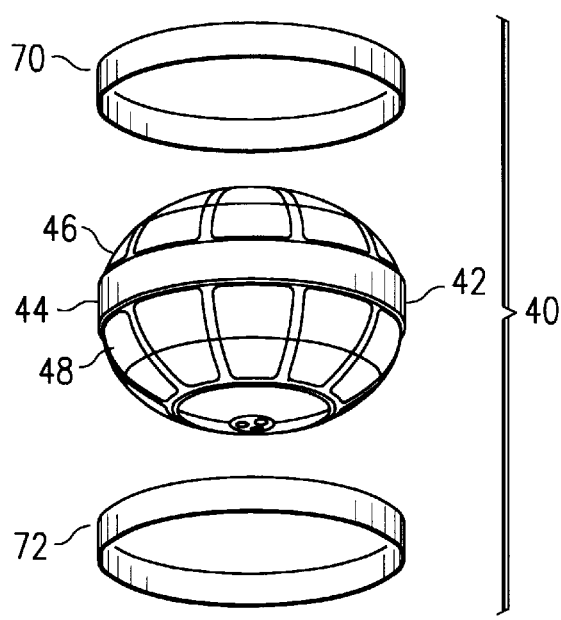
FIG. 3 is an exploded, generally schematic pictorial view of the cryogenic tank of the launch assist platform of the launch vehicle of FIG. 1.

FIG. 3 illustrates LAP cryogenic tank 40 having a body 42 of similar construction as OV cryogenic tank 30, except that tank 40 is more nearly spherical than tank 30, which is elongated axially. Thus, tank 40 has a relatively short (axially) circular cylindrical peripheral wall 44, and forward and aft end walls 46 and 48, each of which is substantially semi-spherical.

Figure 5:
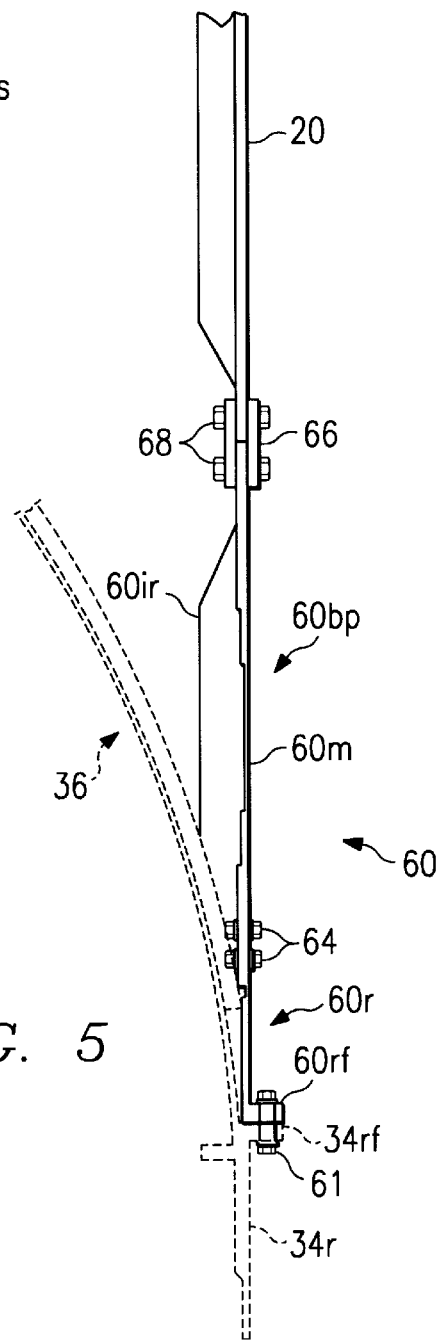
FIG. 5 is a partial side cross-sectional view of a portion of the tank of FIGS. 2 and 4, which is representative of portions of the tanks, skirts, and wall members of the tanks of both the orbital vehicle and the launch assist platform of FIG. 1.

The peripheral walls 34 and 44 of the tanks 30 and 40 form parts of the structural/aerodynamic outer walls or shells of the launch vehicle. By virtue of the end domes 36, 38, 46, and 48, which span the outer wall of each vehicle transversely, and relatively strong end rings at each end of the peripheral walls (a typical one is shown in FIG. 5 and described below), each of the cryogenic tanks as a unit forms a strong, radially stiff structural element of the outer wall, which helps maintain the circular shape of the outer wall. The peripheral walls 34 and 44 of the cryogenic tanks 30 and 40 align with the composite panels and the skirts (described below), which support the tanks 30 and 40 from the outer wall of each vehicle and eliminate the need for additional brackets or similar parts to join the tanks to the vehicle outer walls.

Figure 4:
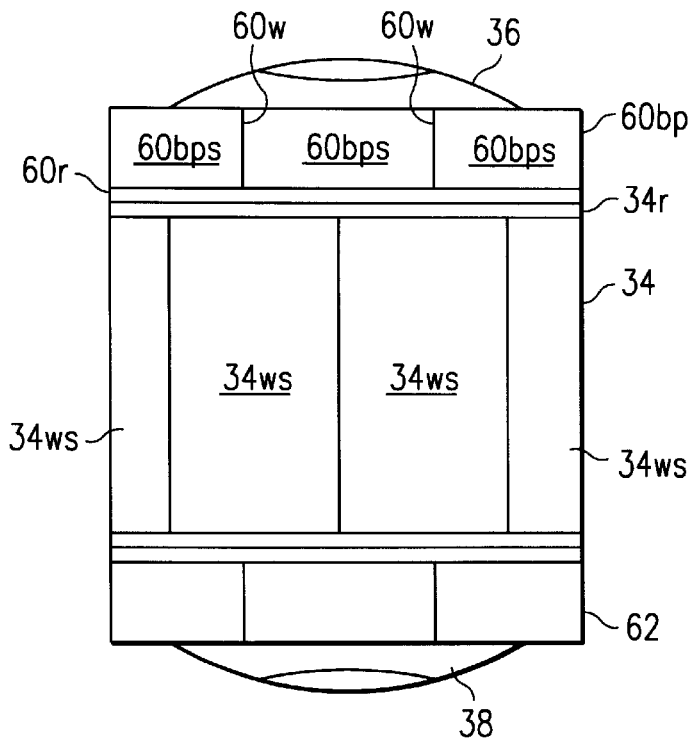
FIG. 4 is a side elevational view of the tank of FIG. 2.

Cryogenic tank 30 of the OV has a forward skirt 60 that is joined to the forward end of the peripheral wall 34 and an aft skirt 62 that is joined to the aft end of the peripheral wall 34. Similarly, cryogenic tank 40 of the LAP has a forward skirt 70 that is joined to the forward end of the peripheral wall 44 and an aft skirt 72 that is joined to the aft end of the peripheral wall 44. Each skirt is composed of two parts, a skirt ring and a skirt barrel. Although FIGS. 4 and 5 illustrate portions of the OV cryogenic tank 30, the following description is applicable to the forward and aft skirts of both tanks 30 and 40.

The peripheral wall 34 of the tank body 32 has a forward ring 34r, which is CNC-machined from a thick, solid forged aluminum plate and is welded to the forward ends of wall segments 34ws. Ring 34r has an outwardly extending flange portion 34rf. Forward skirt 60 has two parts, a skirt ring 60r and a skirt barrel panel 60*bp*. Skirt ring 60*r* has an outwardly extending circumferential flange portion 60*rf* that mates with the flange portion 34*rf* of the tank forward ring 34*r*. Bolts/nuts 61 pass through holes in the mating flanges and join skirt 60 to tank body 32.

Skirt barrel panel 60*bp* is composed of circumferentially adjacent segments 60*bps* that are joined along weldments 60*w*. Each segment 60*bps* is rolled to the required curvature from aluminum plate and CNC-machined to provide a membrane 60*m* internal circumferentially spaced apart axially extending stiffening ribs 60*ir*. In a particular embodiment, skirt barrel panel 60*bp* may also include axially spaced apart circumferentially extending stiffening ribs. The present invention contemplates any number, size, and arrangement of stiffening ribs disposed on the internal areas of the LAP/OV cryogenic tank skirts. Generally, an integral stiffener system comprises a collection of internal stiffening ribs that provide both axial and circumferential strength to the member. Skirt ring 60*r* is joined to skirt barrel panel 60*bp* by an overlapping joint and bolt/nuts 64. The forward end of skirt 60 is connected to forward composite panel 20 by splice rings 66 and bolts/nuts 68.

Each skirt 60 is of a length such that the end remote from the cryogenic tank is above a temperature (e.g., −60° F.) when the cryogenic tank is filled that ensures the structural integrity of the adjacent composite panel. In a particular embodiment, a length of not less than about thirty inches provides that result. The skirt receives heat from the environment by conduction and radiation, and the heat flux along the skirt maintains the desired temperature differential. The skirt expands and contracts progressively along its length as a function of the temperature gradient in accordance with changes in the temperature of the tank body. By maintaining the end of each skirt remote from the tank body above a minimum temperature, contraction of the end of the skirt at the juncture with an adjacent composite panel prevents the skirt and the composite panel from being excessively stressed and also keeps the part of the composite panel adjacent the juncture with the skirt from reaching a temperature at which its strength is excessively degraded by embrittlement.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An outer wall for a launch vehicle, comprising:
   a peripheral wall portion of a metal cryogenic tank, the peripheral wall portion having a forward end and an aft end;
   a metal forward skirt attached to the forward end of the peripheral wall portion of the cryogenic tank and having a forward end spaced apart from the forward end of the peripheral wall portion of the cryogenic tank; and
   a forward wall member of composite material attached to the forward end of the forward skirt.

2. The wall of claim 1, wherein the forward end of the forward skirt is spaced apart from the forward end of the peripheral wall portion of the cryogenic tank by a distance sufficient to maintain the forward end of the forward skirt above a predetermined temperature.

3. The wall of claim 1, further comprising:
   a metal aft skirt attached to the aft end of the peripheral wall portion of the cryogenic tank and having an aft end remote from the aft end of the peripheral wall portion of the cryogenic tank; and
   an aft wall member of composite material attached to the aft end of the aft skirt.

4. The wall of claim 3, wherein the aft end of the aft skirt is spaced apart from the aft end of the peripheral wall portion of the cryogenic tank by a distance sufficient to maintain the aft end of the aft skirt above a predetermined temperature.

5. The wall of claim 3, wherein the aft skirt comprises:
   a skirt ring attached to the aft end of the peripheral wall portion of the cryogenic tank; and
   a skirt barrel panel attached to an aft end of the skirt ring.

6. The wall of claim 5, wherein the aft end of the peripheral wall portion of the cryogenic tank has an outwardly extending flange portion and the aft skirt ring has an outwardly extending flange portion that mates with the flange portion of the aft end of the peripheral wall portion of the cryogenic tank.

7. The wall of claim 6, wherein the aft skirt ring is attached to the peripheral wall portion of the cryogenic tank by bolts that pass through the mating flange portions and receive nuts.

8. The wall of claim 1, wherein the forward skirt comprises:
   a skirt ring attached to the forward end of the peripheral wall portion of the cryogenic tank; and
   a skirt barrel panel attached to a forward end of the skirt ring.

9. The wall of claim 8, wherein the forward end of the peripheral wall portion of the cryogenic tank has an outwardly extending flange portion and the skirt ring has an outwardly extending flange portion that mates with the flange portion of the forward end of the peripheral wall portion of the cryogenic tank.

10. The wall of claim 9, wherein the skirt ring is attached to the peripheral wall portion of the cryogenic tank by bolts that pass through the mating flange portions and receive nuts.

11. An outer wall for a launch vehicle, comprising:
    a peripheral wall portion of a metal cryogenic tank, the peripheral wall portion having a forward end and an aft end;
    a metal forward skirt attached to the forward end of the peripheral wall portion of the cryogenic tank and having a forward end spaced apart from the forward end of the peripheral wall portion of the cryogenic tank by a distance sufficient to maintain the forward end of the forward skirt above approximately −60° F.; and
    a forward wall member of composite material attached to the forward end of the forward skirt.

12. An outer wall for a launch vehicle, comprising:
    a peripheral wall portion of a metal cryogenic tank, the peripheral wall portion having a forward end and an aft end;
    a metal forward skirt attached to the forward end of the peripheral wall portion of the cryogenic tank and having a forward end spaced by a distance of not less than about thirty inches from the forward end of the peripheral wall portion of the cryogenic tank; and
    a forward wall member of composite material attached to the forward end of the forward skirt.

13. An outer wall for a launch vehicle, comprising:
a peripheral wall portion of a metal cryogenic tank, the peripheral wall portion having a forward end and an aft end;
a metal forward skirt attached to the forward end of the peripheral wall portion of the cryogenic tank and having a forward end spaced apart from the forward end of the peripheral wall portion of the cryogenic tank;
a forward wall member of composite material attached to the forward end of the forward skirt;
a metal aft skirt attached to the aft end of the peripheral wall portion of the cryogenic tank and having an aft end spaced apart from the aft end of the peripheral wall portion of the cryogenic tank by a distance sufficient to maintain the aft end of the aft skirt above approximately −60° F.; and
an aft wall member of composite material attached to the aft end of the aft skirt.

14. An outer wall for a launch vehicle, comprising:
a peripheral wall portion of a metal cryogenic tank, the peripheral wall portion having a forward end and an aft end;
a metal forward skirt attached to the forward end of the peripheral wall portion of the cryogenic tank and having a forward end spaced apart from the forward end of the peripheral wall portion of the cryogenic tank;
a forward wall member of composite material attached to the forward end of the forward skirt;
a metal aft skirt attached to the aft end of the peripheral wall portion of the cryogenic tank and having an aft end spaced apart from the aft end of the peripheral wall portion of the cryogenic tank by a distance not less than about thirty inches; and
an aft wall member of composite material attached to the aft end of the aft skirt.

15. An outer wall for a launch vehicle, comprising:
a peripheral wall portion of a metal cryogenic tank, the peripheral wall portion having a forward end and an aft end;
a metal forward skirt attached to the forward end of the peripheral wall portion of the cryogenic tank and having a forward end spaced apart from the forward end of the peripheral wall portion of the cryogenic tank, wherein the forward skirt comprises:
    a skirt ring attached to the forward end of the peripheral wall portion of the cryogenic tank; and
    a skirt barrel panel attached to a forward end of the skirt ring, wherein the skirt barrel panel comprises a plurality of internal circumferentially spaced apart axially extending stiffening ribs and a plurality of internal axially spaced apart circumferentially extending stiffening ribs; and
a forward wall member of composite material attached to the forward end of the forward skirt.

16. An outer wall for a launch vehicle, comprising:
a peripheral wall portion of a metal cryogenic tank, the peripheral wall portion having a forward end and an aft end;
a metal forward skirt attached to the forward end of the peripheral wall portion of the cryogenic tank and having a forward end spaced apart from the forward end of the peripheral wall portion of the cryogenic tank;
a forward wall member of composite material attached to the forward end of the forward skirt;
a metal aft skirt attached to the aft end of the peripheral wall portion of the cryogenic tank and having an aft end remote from the aft end of the peripheral wall portion of the cryogenic tank, wherein the aft skirt comprises:
    a skirt ring attached to the aft end of the peripheral wall portion of the cryogenic tank; and
    a skirt barrel panel attached to an aft end of the skirt ring, wherein the skirt barrel panel comprises a plurality of internal circumferentially spaced apart axially extending stiffening ribs and a plurality of internal axially spaced apart circumferentially extending stiffening ribs; and
an aft wall member of composite material attached to the aft end of the aft skirt.

17. A metal cryogenic tank for a launch vehicle, comprising:
a cylindrical peripheral wall portion adapted to form a portion of an outer wall of the launch vehicle and having a forward end and an aft end;
a metal forward skirt attached to the forward end of the peripheral wall portion and having a forward end spaced apart from the forward end of the peripheral wall portion of the cryogenic tank by a distance sufficient to maintain the forward end of the forward skirt above a predetermined temperature; and
a metal aft skirt attached to the aft end of the peripheral wall portion and having an aft end spaced apart from the aft end of the peripheral wall portion of the cryogenic tank;
the forward skirt and aft skirt being adapted to form portions of the outer wall of the launch vehicle.

18. The metal cryogenic tank of claim 17, wherein the forward skirt comprises:
a skirt ring attached to the forward end of the peripheral wall portion; and
a skirt barrel panel attached to a forward end of the skirt ring.

19. The metal cryogenic tank of claim 18, wherein the forward end of the peripheral wall portion has an outwardly extending flange portion and the skirt ring has an outwardly extending flange portion that mates with the flange portion of the forward end of the peripheral wall portion.

20. The metal cryogenic tank of claim 19, wherein the skirt ring is attached to the peripheral wall portion by bolts that pass through the mating flange portions and receive nuts.

21. The metal cryogenic tank of claim 17, wherein the aft skirt comprises:
a skirt ring attached to the aft end of the peripheral wall portion; and
a skirt barrel panel attached to an aft end of the skirt ring.

22. The metal cryogenic tank of claim 21, wherein the aft end of the peripheral wall portion has an outwardly extending flange portion and the skirt ring has an outwardly extending flange portion that mates with the flange portion of the aft end of the peripheral wall portion.

23. The metal cryogenic tank of claim 22, wherein the skirt ring is attached to the peripheral wall portion by bolts that pass through the mating flange portions and receive nuts.

24. The metal cryogenic tank of claim 17, wherein
the aft end of the aft skirt is spaced apart from the aft end of the peripheral wall portion by a distance sufficient to maintain the aft end of the aft skirt above the predetermined temperature.

25. A metal cryogenic tank for a launch vehicle, comprising:
- a cylindrical peripheral wall portion adapted to form a portion of an outer wall of the launch vehicle and having a forward end and an aft end;
- a metal forward skirt attached to the forward end of the peripheral wall portion and having a forward end spaced apart from the forward end of the peripheral wall portion of the cryogenic tank, wherein the forward skirt comprises:
  - a skirt ring attached to the forward end of the peripheral wall portion; and
  - a skirt barrel panel attached to a forward end of the skirt ring, wherein the skirt barrel panel comprises an integral stiffener system to provide both axial and circumferential strength; and
- a metal aft skirt attached to the aft end of the peripheral wall portion and having an aft end spaced apart from the aft end of the peripheral wall portion of the cryogenic tank;
- the forward skirt and aft skirt being adapted to form portions of the outer wall of the launch vehicle.

26. A metal cryogenic tank for a launch vehicle, comprising:
- a cylindrical peripheral wall portion adapted to form a portion of an outer wall of the launch vehicle and having a forward end and an aft end;
- a metal forward skirt attached to the forward end of the peripheral wall portion and having a forward end spaced apart from the forward end of the peripheral wall portion of the cryogenic tank; and
- a metal aft skirt attached to the aft end of the peripheral wall portion and having an aft end spaced apart from the aft end of the peripheral wall portion of the cryogenic tank, wherein the aft skirt comprises:
  - a skirt ring attached to the aft end of the peripheral wall portion; and
  - a skirt barrel panel attached to an aft end of the skirt ring, wherein the skirt barrel panel comprises an integral stiffener system to provide both axial and circumferential strength;
- the forward skirt and aft skirt being adapted to form portions of the outer wall of the launch vehicle.

27. A metal cryogenic tank for a launch vehicle, comprising:
- a cylindrical peripheral wall portion adapted to form a portion of an outer wall of the launch vehicle and having a forward end and an aft end;
- a metal forward skirt attached to the forward end of the peripheral wall portion and having a forward end spaced apart from the forward end of the peripheral wall portion of the cryogenic tank by a distance not less than about thirty inches; and
- a metal aft skirt attached to the aft end of the peripheral wall portion and having an aft end spaced apart from the aft end of the peripheral wall portion of the cryogenic tank by a distance not less than about thirty inches;
- the forward skirt and aft skirt being adapted to form portions of the outer wall of the launch vehicle.

28. A metal cryogenic tank for a launch vehicle, comprising:
- a cylindrical peripheral wall portion adapted to form a portion of an outer wall of the launch vehicle and having a forward end and an aft end;
- a metal forward skirt attached to the forward end of the peripheral wall portion and having a forward end spaced apart from the forward end of the peripheral wall portion of the cryogenic tank by a distance sufficient to maintain the forward end of the forward skirt above approximately −60° F.; and
- a metal aft skirt attached to the aft end of the peripheral wall portion and having an aft end spaced apart from the aft end of the peripheral wall portion of the cryogenic tank by a distance sufficient to maintain the aft end of the aft skirt above approximately −60° F.;
- the forward skirt and aft skirt being adapted to form portions of the outer wall of the launch vehicle.

* * * * *